United States Patent [19]

Westerberg et al.

[11] Patent Number: 5,726,423

[45] Date of Patent: Mar. 10, 1998

[54] APPARATUS AND METHOD FOR REGULATING COOKING TIME IN A RADIANT ENERGY OVEN

[75] Inventors: Eugene R. Westerberg, Palo Alto; John W. O'Neal, Burlingame, both of Calif.

[73] Assignee: Quadlux, Inc., Fremont, Calif.

[21] Appl. No.: 756,458

[22] Filed: Nov. 26, 1996

Related U.S. Application Data

[63] Continuation of Ser. No. 391,621, Feb. 21, 1995, which is a continuation of Ser. No. 65,878, May 21, 1993, which is a continuation-in-part of Ser. No. 738,207, Jul. 30, 1991, which is a continuation-in-part of Ser. No. 350,024, May 12, 1989, Pat. No. 5,036,179, which is a continuation-in-part of Ser. No. 195,967, May 19, 1988, abandoned.

[51] Int. Cl.$^6$ .................... H05B 3/68; A21B 2/00
[52] U.S. Cl. ................. 219/411; 219/413; 426/248; 426/523; 99/331
[58] Field of Search .................... 219/405, 411, 219/412, 413, 414, 391, 399, 400, 494; 392/416, 418; 99/328, 333, 331, 451, 467, 483; 426/523, 241, 242, 243, 248; 364/557

[56] References Cited

U.S. PATENT DOCUMENTS

| | | | |
|---|---|---|---|
| 2,549,619 | 4/1951 | Miskella | 219/411 |
| 2,864,932 | 12/1958 | Forrer | 219/35 |
| 3,037,443 | 6/1962 | Newkirk et al. | 99/332 |
| 3,304,406 | 2/1967 | King | 219/411 |
| 3,313,917 | 4/1967 | Ditzler et al. | 219/400 |
| 3,326,692 | 6/1967 | Martino et al. | 99/328 |
| 3,448,678 | 6/1969 | Burstein | 99/386 |

(List continued on next page.)

FOREIGN PATENT DOCUMENTS

| | | |
|---|---|---|
| 23724 | 2/1981 | European Pat. Off. |
| 0215617 | 9/1986 | European Pat. Off. ........ H05B 3/44 |
| 25 46 106 | 4/1977 | Germany .............. A47J 37/06 |
| 3503648 | 4/1986 | Germany . |
| 57-60007 | 4/1982 | Japan . |
| 57-70323 | 4/1982 | Japan . |
| 59-47302 | 3/1984 | Japan ................. 219/405 |
| 60-69920 | 5/1985 | Japan . |
| 60-167932 | 11/1985 | Japan . |
| 60-245933 | 12/1985 | Japan . |
| 63-34913 | 3/1988 | Japan . |
| 63-46720 | 3/1988 | Japan . |
| 1-315982 | 12/1989 | Japan . |
| 4-361714 | 12/1992 | Japan . |
| 1273023 | 5/1972 | United Kingdom . |
| 2132060 | 8/1983 | United Kingdom ........ H05B 3/74 |
| 2132060 | 6/1984 | United Kingdom . |
| 2152790 | 8/1985 | United Kingdom . |

OTHER PUBLICATIONS

Fostoria Corporation, "Heat Processing with Infrared", Feb., 1962, pp. 1–7.

Summer, W. Dr., "Ultra–Violet and Infra–Red Engineering", 1962, pp. 102–112.

Beggs, E.W., "Quicker Drying with Lamps", Jul., 1939, vol. 97, No. 7, pp. 88–89.

Harold McGee, Book, "On Food and Cooking", Charles Schribner's Sons, New York, 1984, Chapter 14, pp. 608–624.

Primary Examiner—Teresa J. Walberg
Assistant Examiner—J. Pelham
Attorney, Agent, or Firm—Limbach & Limbach L.L.P.

[57] ABSTRACT

An oven for cooking with light having wavelengths in the visible, near visible, and infra-red spectral ranges cooks food items for periods that are predetermined for given food items. When prolonged use of the oven increases the oven temperature, a thermistor detects the temperature increases and delivers a signal representing the increase to a microprocessor. The microprocessor is programmed to compensate for increases in the oven temperature by lowering the cooking time for a given food item below the predetermined period. Some of the heated air that accumulates in the oven is withdrawn by an evacuation device.

8 Claims, 6 Drawing Sheets

U.S. PATENT DOCUMENTS

| | | | |
|---|---|---|---|
| 3,569,656 | 3/1971 | White et al. | 219/10.55 B |
| 3,828,163 | 8/1974 | Amagami et al. | 219/413 |
| 4,244,284 | 1/1981 | Flavan, Jr. et al. | 99/331 |
| 4,360,726 | 11/1982 | Haden | 219/494 |
| 4,410,779 | 10/1983 | Weiss | 219/10.55 B |
| 4,421,974 | 12/1983 | Oota et al. | 219/492 |
| 4,463,238 | 7/1984 | Tanabe | 219/10.55 B |
| 4,481,405 | 11/1984 | Malick | 219/405 |
| 4,483,631 | 11/1984 | Kydd | 364/557 |
| 4,486,639 | 12/1984 | Mittelsteadt | 219/10.55 B |
| 4,516,486 | 5/1985 | Burkhart | 99/388 |
| 4,554,437 | 11/1985 | Wagner et al. | 219/388 |
| 4,575,616 | 3/1986 | Bergendal | 219/405 |
| 4,601,004 | 7/1986 | Holt et al. | 99/328 |
| 4,687,895 | 8/1987 | Chitre et al. | 219/10.55 B |
| 4,700,051 | 10/1987 | Goessler et al. | 219/464 |
| 4,731,251 | 3/1988 | Jovanovic | 426/243 |
| 4,761,529 | 8/1988 | Tsisios | 219/10.55 B |
| 5,034,235 | 7/1991 | Dunn et al. | 426/248 |
| 5,171,974 | 12/1992 | Koether et al. | 219/506 |
| 5,179,265 | 1/1993 | Sheridan et al. | 99/328 |
| 5,308,161 | 5/1994 | Stein | 392/416 |
| 5,315,092 | 5/1994 | Takahashi et al. | 392/418 |
| 5,317,130 | 5/1994 | Burkett et al. | 219/492 |
| 5,319,171 | 6/1994 | Tazawa | 219/705 |
| 5,352,865 | 10/1994 | Burkett et al. | 219/492 |
| 5,378,872 | 1/1995 | Jovanovic | 219/405 |
| 5,382,441 | 1/1995 | Lentz et al. | 436/411 |
| 5,478,986 | 12/1995 | Westerberg | 219/411 |
| 5,517,005 | 5/1996 | Westerberg et al. | 219/405 |

1

APPARATUS AND METHOD FOR REGULATING COOKING TIME IN A RADIANT ENERGY OVEN

RELATED APPLICATIONS

This is a continuation of application No. 08/391,621 filed on Feb. 21, 1995 which is a continuation of application No. 08/065,878, filed on May 21, 1993, which is a continuation-in-part of application Ser. No. 07/738,207, filed Jul. 30, 1991 which was a continuation-in-part of application Ser. No. 07/350,024, filed May 12, 1989, now U.S. Pat. No. 5,036,179 which was in turn a continuation-in-part of application Ser. No. 07/195,967, filed May 19, 1988, now abandoned.

FIELD OF THE INVENTION

This invention relates to the field of radiant source ovens. More particularly, this invention relates to ovens which are capable of adjusting oven lamp intensity and cooking time based upon the measured temperature in the oven at a given time.

BACKGROUND OF THE INVENTION

Ovens having linear sources of visible and infra-red radiant energy are disclosed and described in U.S. Pat. No. 5,036,179 and U.S. patent application Ser. No. 07/738,207 which are incorporated herein by reference. These ovens provide high-speed, high-quality cooking and baking of food items by impinging high-intensity visible, near-visible, and infrared radiations onto a food item. The ovens cook the food items within the short periods of time normally found in microwave cooking while maintaining the browning of infrared cooking and the quality of conduction-convection cooking. When food is exposed to a sufficiently intense source of visible, near-visible, and infrared radiation, the food absorbs low levels of visible and near-visible radiation, thereby allowing the energy to penetrate the foodstuff and heat it deeply. The longer infrared radiation does not penetrate deeply but acts as an effective browning agent.

Ordinarily, the source of the visible, near-visible and infrared radiation is one or more quartz-halogen tungsten lamps, or equivalent means such as quartz arc lamps. Typical quartz-halogen lamps of this type operate at 3000 degrees Kelvin and convert electrical energy into black body radiation having a range of wavelengths from 0.4 µm to 4.5 µm with a peak intensity at 0.965 µm. Each lamp can generally provide up to 1.5 to 2 KW of radiant energy with a significant portion of the energy in the visible light spectrum.

The ovens can use a plurality of these lamps or an array of several lamps either operated in unison or selectively operated in varying combinations as necessary for the particular food item sought to be cooked. These radiation sources are ordinarily positioned above and below the food item. The walls of the surrounding food chamber are preferably made from highly reflective surfaces. The visible and infrared waves from the radiation sources impinge directly on the food item and are also reflected off the reflected surfaces and onto the food item from many angles. This reflecting action improves uniformity of cooking.

Ovens of this type preferably include a microprocessor into which cooking times for a variety of dishes and food types may be entered. This allows the user to select the cooking time for a specific dish using controls located on the front panel of the oven. Selecting the cooking program for a specific dish will illuminate the lamps for the cooking time required to cook the specific dish.

Convection cooking occurs when a blanket of heated air inside a convection oven transfers the energy stored in the heated air to the food positioned inside the oven. It is well known that virtually all convection ovens require a "preheat" time during which the temperature inside the oven is raised to the desired cooking temperature. During preheating, the air inside the oven accumulates and stores heat energy. Thus the amount of heat that must be supplied to the oven is reduced during the cooking cycle.

The cooking function in a radiant source oven is not primarily performed by heated air. Cooking is instead accomplished by the interaction of the light and infrared radiation with the food. In a normal cooking cycle, the food is positioned inside a room-temperature oven. The radiation sources, or lamps, are then illuminated for the duration of the cooking cycle and are immediately turned off at the end of the cooking cycle. If several separate food items are to be cooked, the process is repeated for each food item; the lamps do not remain illuminated between the cooking cycles.

Food items in radiation source ovens are cooked for predetermined periods of time, and cooking times are calculated under the assumption that the ovens are initially at room temperature and are programmed into the ovens for various different food items. If several items of food are cooked in sequence, heated air accumulates in the oven. The heated air delivers heat energy, which is additional to the energy delivered to the food by the lamps, to the food items and causes the food items to become overcooked even where they have been cooked for the predetermined cooking time. With each consecutive cooking cycle the required cooking time thus decreases due to the accumulation of heat energy within the oven.

When the cooking cycle is timed using a radiant source oven that is initially at room temperature, the oven normally cooks a 9 inch diameter pizza in 65 seconds. If several pizzas are cooked in rapid sequence, the cooking time decreases to 45 seconds after 2 or 3 pizzas are cooked. If heat accumulation within the oven is not factored into the cooking cycle, the oven will produce pizzas that are burned.

Because the oven's internal parts become heated during cooking, evacuation of heated air cannot fully compensate for the problem of increased oven temperature. A solution is needed whereby the cooking time is automatically adjusted to compensate for an increased oven temperature.

SUMMARY OF THE INVENTION

The present invention utilizes a thermistor positioned in a radiant source oven in a location in which heat is known to accumulate. A microprocessor receives a signal representing thermistor measurements and adjusts the cooking time to compensate for the added cooking effect that the heated air in the oven and/or heated parts within the oven will have on a food item positioned in the oven for cooking. In the preferred embodiment, an evacuator removes a portion of the heated air from the oven to partially decrease the temperature of the oven interior.

DETAILED DESCRIPTION OF THE INVENTION

Figure 1A:
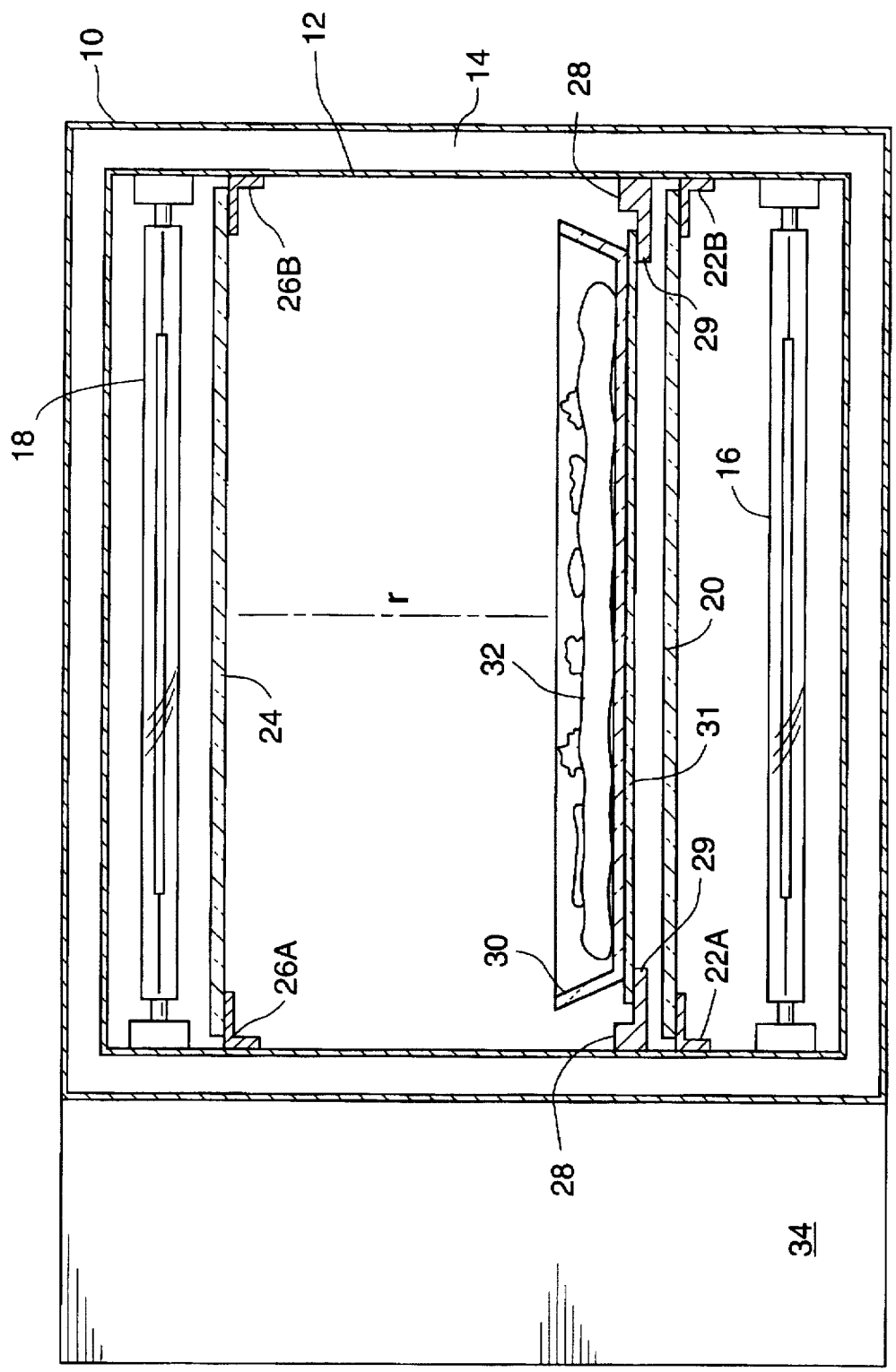
FIG. 1A is a front section view of a radiant source oven.
Figure 1B:
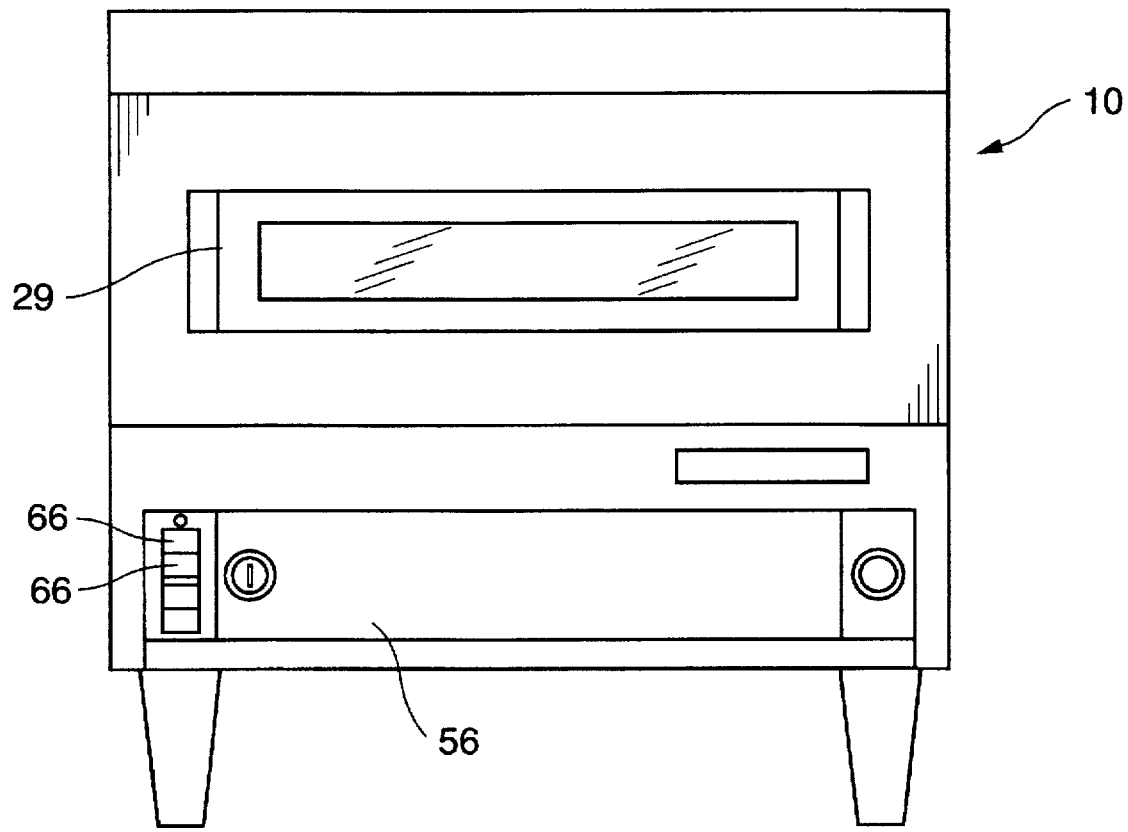
FIG. 1B is a front elevation view of a radiant source oven.

The present invention is comprised generally of an oven 10, upper and lower radiant energy sources, or lamps 18, 16, a thermistor 42, a microprocessor 44, and an evacuation tube 46.

FIG. 1A is a front section view of a radiant source oven of the type for which the present invention is designed. The energy for cooking is supplied by lower heating lamps 16 and upper radiation heating lamps 18. The lamps are preferably quartz-halogen tungsten lamps which are capable of producing approximately 2 kW of radiant power, for a total radiant power of in excess of 4 kW, and with a significant portion of the light energy in the visible near visible light spectrum. The oven according to the preferred embodiment cooks with approximately 8% of the radiant energy in the visible light range of the electromagnetic spectrum, or with approximately 40% to 50% of the energy in the visible and near-visible light range of the spectrum. When illuminated, the lighted portion of a preferred lamp has a length of approximately 10 inches.

The inner surface of the inner wall 12 is preferably a highly polished metal, such as aluminum or stainless steel, which is very reflective to the wide spectrum of wavelengths from the radiant lamps. The oven has a door 29 which also has a reflect inner surface. These reflect surfaces improve uniformity of cooking by reflecting light energy from the lamps onto the food surface. Reflection may be further enhanced by positioning the lamps in upper and lower reflector assemblies 60a, 60b (FIG. 1C).

Two radiation transparent plates 20 and 24 are used to isolate the cooking chamber from the radiant lamps, making the oven easier to clean. These plates can be formed from materials, such as high quality heat-resistant glasses or ceramics that are transparent to visible, non-visible and infrared radiations. The lower transparent plate 20 is supported by brackets 22a and 22b and is positioned above the lower lamps 16. The upper transparent plate 24 is supported by brackets 26a and 26b and is positioned below upper lamps 18.

Shelf 28 is mounted between the transparent plates inside the oven chamber. As shown in FIG. 1C, the shelf 28 has a circular cut out portion 27 which is designed to support a circular rack (not shown) having a grid of small diameter metallic bars. The food item, or a heat-resistant glass or ceramic dish which holds the food, rests on top of the rack during cooking. The rack has a diameter of preferably 12 to 14 inches and is capable of rotating around an axis of rotation, designated r in FIG. 1A.

Figure 1C:
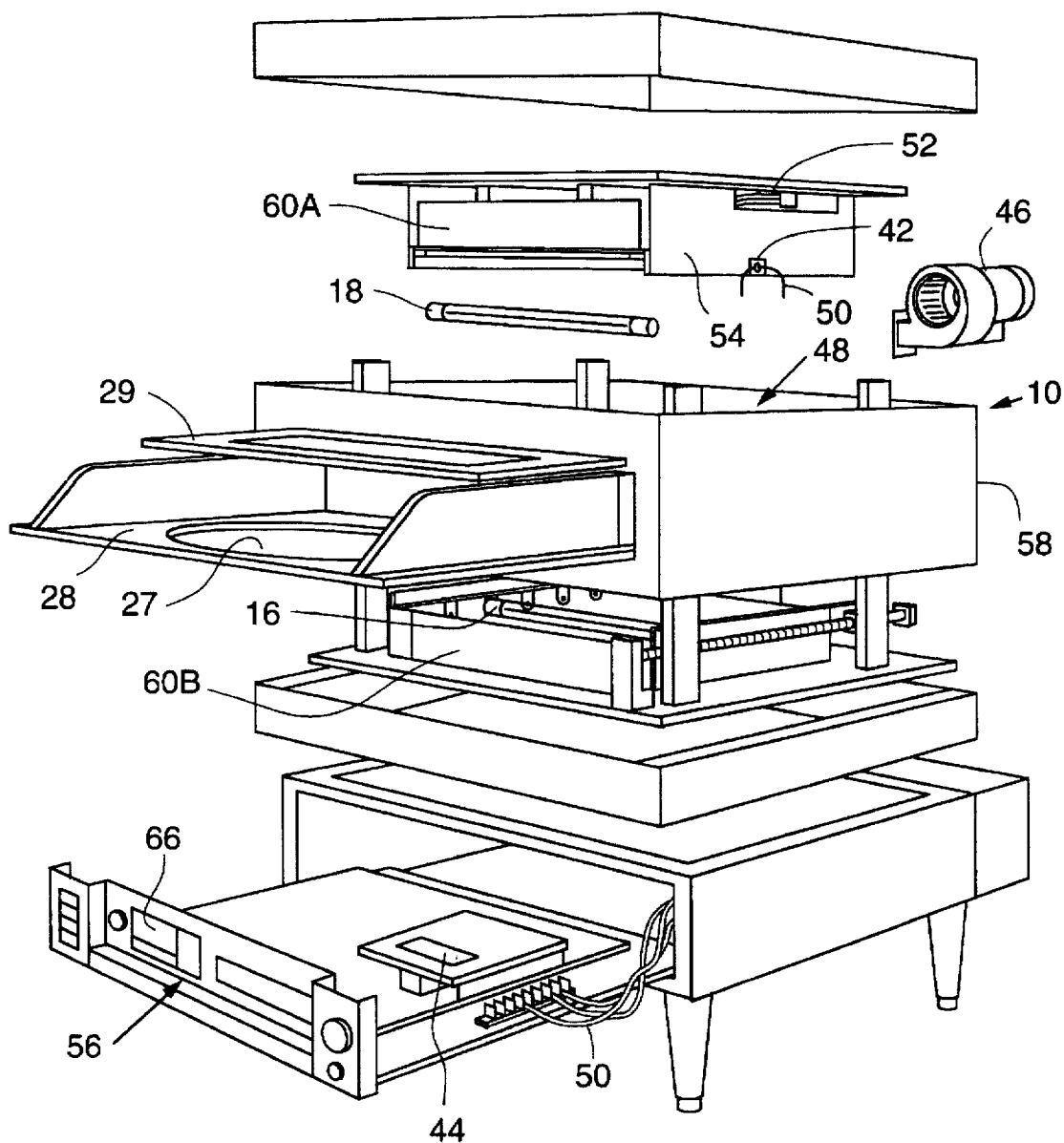
FIG. 1C is an exploded view of an oven according to the present invention showing the thermistor in a preferred location.

Referring to FIG. 1C, a thermistor 42 is positioned within cooking chamber 48. The preferred thermistor is a 10 kohm axial, glass-bodied thermistor that is inserted into a low mass aluminum holder. During cooking, heat accumulates in certain regions, referred to as "hot spots", within the oven. The thermistor is positioned in a hot spot so that it can detect temperature changes that closely resemble the changes in heat energy being stored in the oven.

In the preferred embodiment, the thermistor is attached to the lower side of an upper reflector assembly 60a and is positioned approximately within 1 inch from the horizontal plane containing the axes of the upper array of lamps 18. The location was selected, in part, because a large portion of the heated air in the oven will be located near the top of the oven chamber. Moreover, the mass of the assembly to which the thermistor is attached has an quantity of heat sink that is representative of the energy storing characteristics of the oven.

Leads 43 connect the thermistor to the thermistor circuit. The leads pass through the body of the oven 10 and interface with the microprocessor circuit 44 near the front panel 56 of the oven. An evacuation tube (not shown) extends from the rear panel 58 of the oven and is connected to a fan 46.

Figure 2:
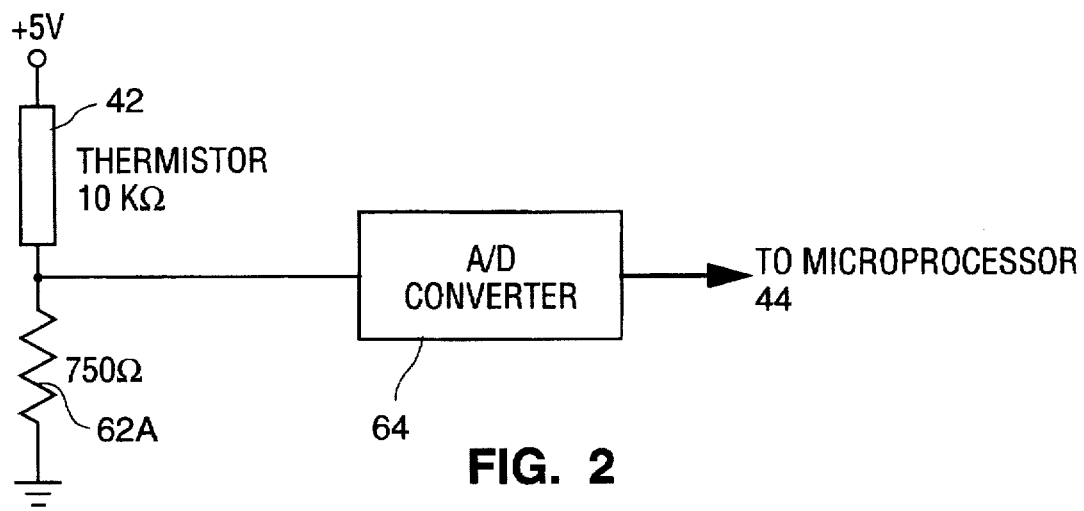
FIGS. 2 and 3 are schematic representations of the thermistor and microprocessor configurations according to the present invention.
Figure 3:
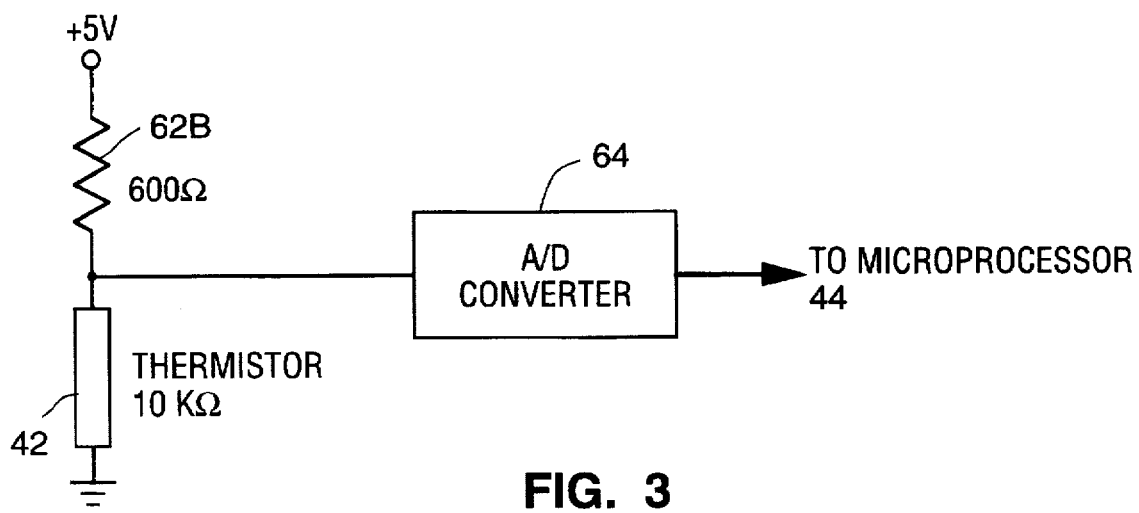

Thermistor circuitry for two radiant ovens having different chamber sizes are schematically illustrated in FIGS. 2 and 3. The first embodiment of the circuitry, designed for an oven having a 9 inch diameter circular cooking area, is comprised of a 10 kohm thermistor 42 and a 750 ohm resistor 62a connected across a 5 V potential. The thermistor is connected at the higher potential while the resistor is connected at the lower potential. When the oven temperature increases, the voltage across the resistor increases. This increase in voltage is converted to a digital signal by an analog-to-digital converter 64 and delivered to a microprocessor 44. If the oven temperature has increased the microprocessor decreases the cooking time from the predetermined cooking time to a cooking time that is commensurate with the current oven temperature. The microprocessor may also adjust the lamp intensity, either alone or in combination with the adjustments to cooking time.

In the thermistor circuitry of FIG. 3, which was designed for use in an oven having a 14 inch diameter circular cooking area, a 600 ohm resistor 62b and a 10 kohm thermistor 42 are connected across a 5 V potential, with the thermistor connected at the lower potential and the resistor connected at the higher potential. An increase in the oven temperature produces a decrease in voltage across the thermistor. This voltage drop is converted to a digital signal by the analog-to-digital converter and delivered to the microprocessor which adjusts oven temperature or lamp intensity as described above.

Figure 4:
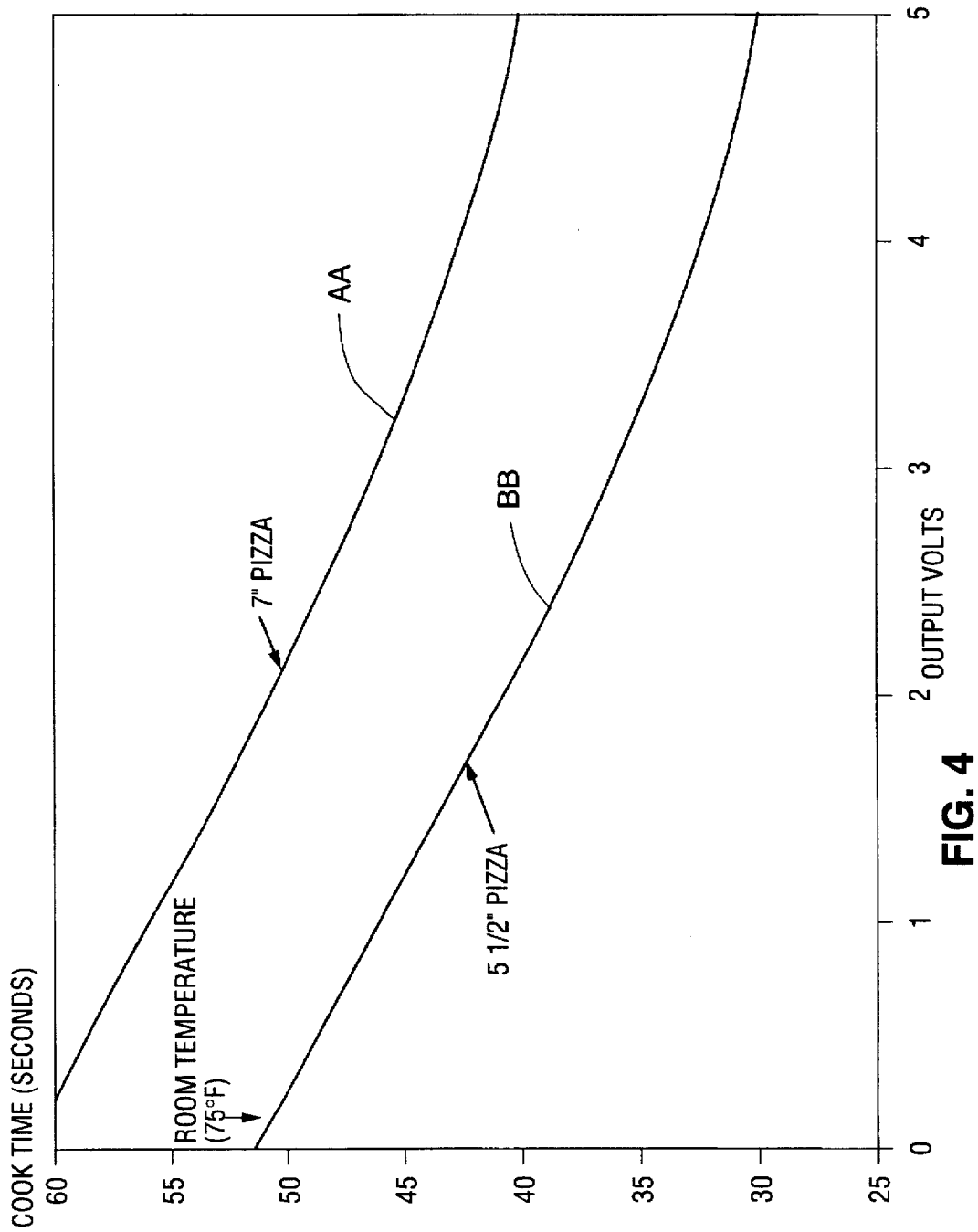
FIG. 4 shows a preferred compensation curve for use with the thermistor configuration of FIG. 2.
Figure 5:
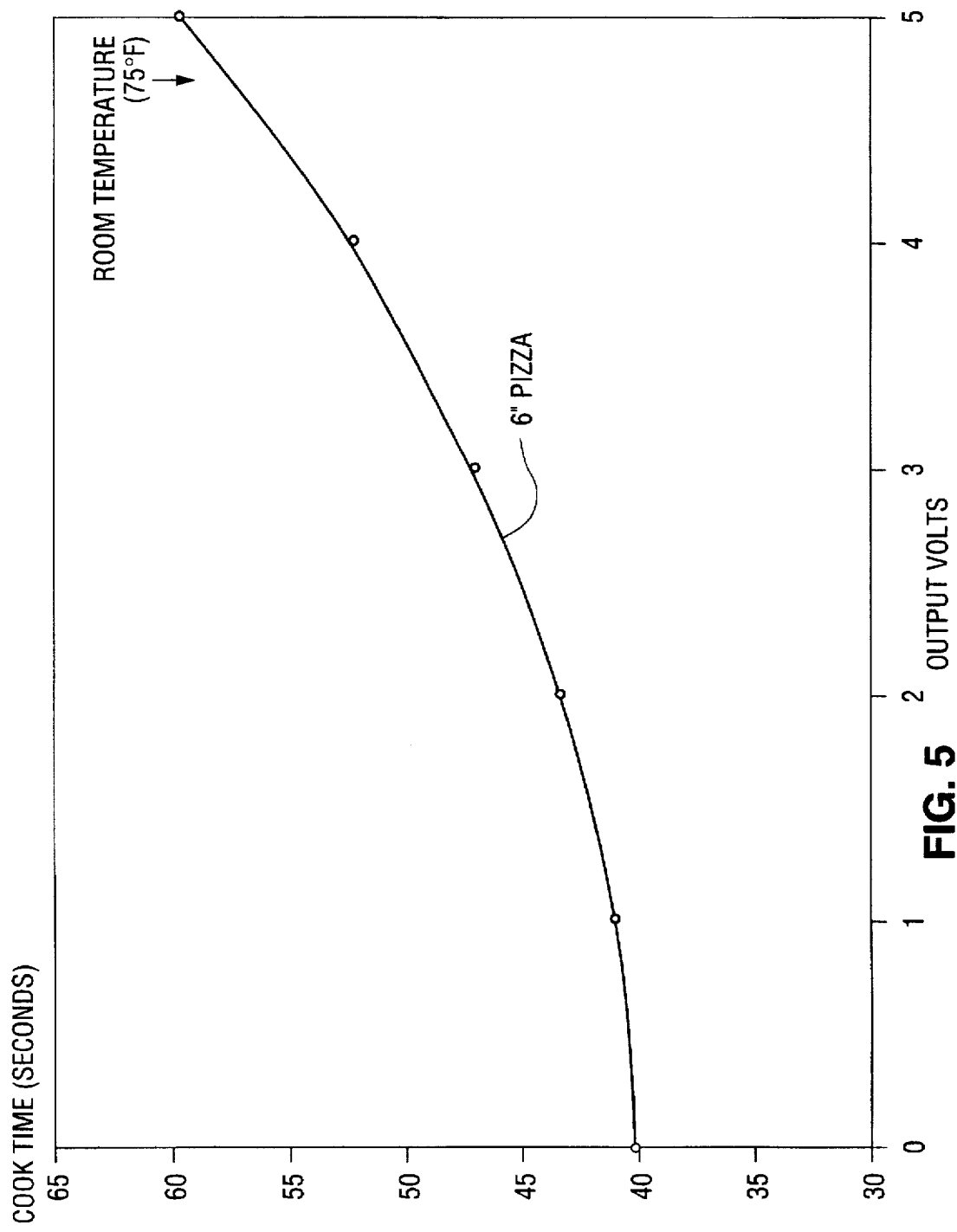
FIG. 5 shows a preferred compensation curve for use with the thermistor configuration of FIG. 3.

The algorithm used by the microprocessor 44 to adjust the cooking time is based on a compensation curve. Compensation curves for the present invention are shown in FIGS. 4 and 5. The curves represent plots of cooking time versus the output voltage across the thermistor circuitry.

FIG. 4 shows a pair of compensation curves which correspond to the compensation circuitry and algorithm for an oven which has a 9 inch diameter cooking area and which utilizes the thermistor configuration of FIG. 2. Curve AA illustrates the decrease that occurs in the cooking time for a 7 inch pizza as the voltage across the thermistor circuitry decreases. Curve BB represents the same measurement for a 5½ inch pizza. Because the slope of the compensation curve does not change, a single compensation algorithm based on the slope of the compensation curve may be used for the microprocessor. This compensation curve was tested using various food types, such as chicken, and it was discovered that the curve successfully adjusts the cooking time for a variety of foods.

FIG. 5 shows the compensation curve for an oven which has a 14 inch diameter cooking area and which utilizes the inverted thermistor configuration of FIG. 3. This curve was generated using a 6 inch diameter pizza and was found to also be consistent for various food types.

To use the oven of the present invention, the food item sought to be cooked is positioned on the rack 31 and the door 29 is closed. The cooking time for a specified food item is entered into the microprocessor 44 using the buttons 66 on the front panel 56 causing the lamps to be illuminated. The thermistor 44 continuously monitors the oven temperature. Increases and decreases in voltage are detected by the analog-to-digital converter and delivered to the microprocessor in the form of digital signals. Using an algorithm based upon the compensation curve for the oven, the microprocessor in turn adjusts the cooking time upwards or downwards to compensate for decreases and increases, respectively, in the oven temperature. A fan evacuates a portion of the heated air through the evacuation tube to partially reduce the amount of heating of the oven chamber.

I claim:

1. In an oven for cooking with radiant energy having a significant portion of the energy in the visible light range of the electromagnetic spectrum the method comprising the steps of:
 a. determining a single hot spot on a heat absorbing surface of the oven where a residual elevated temperature exists and has a relation to the cooking time of food cooked in the oven,
 b. determining an elevation temperature of the hot spot at the time of cooking, and
 c. reducing the normal cooking time for a given recipe for cooking given food by an amount related to the determined elevation of the hot spot.

2. The method of claim 1 further comprising the step of evacuating heated air from the oven.

3. An oven for cooking food with radiant energy having a significant portion of the radiant energy in the visible light range of the electromagnetic spectrum comprising:
 a food cooking chamber having reflective inner walls,
 means for determining a single hot spot on a heat absorbing surface on the oven within the food cooking chamber bounded by said walls where a residual elevated temperature exists and has a relation to the cooking time of food cooked in the oven,
 means for determining an elevation temperature of the hot spot at the time of cooking, and
 means for reducing the normal cooking time for a given recipe for cooking given food by an amount related to the determined elevation of the hot spot.

4. The oven of claim 3 further comprising means for evacuating heated air accumulating in the oven.

5. The oven of claim 3 wherein the means for determine the elevation temperature of the hot spot is comprised of a thermistor positioned in the hot spot.

6. The oven of claim 3 wherein the means for reducing the normal cooking time includes a microprocessor having an input for receiving a signal representing the elevation temperature and a compensation algorithm for determining an amount by which the cooking time is reduced.

7. In an oven for cooking with radiant energy having a significant portion of the energy in the visible light range of the electromagnetic spectrum the method comprising the steps of:
 a. determining a hot spot on a heat absorbing surface on the oven where a residual elevated temperature exists and has a relation to the cooking time of food cooked in the oven,
 determining an elevation temperature of the hot spot at the time of cooking, and
 c. reducing the normal cooking time for a given recipe for cooking given food by an amount related to the determined elevation of the hot spot,
 d. cooking an item of the given food for the reduced cooking time by
  (i) generating in excess of 4 kW of radiant power having at least 40% of its radiant energy in the visible and near-visible light range of the electromagnetic spectrum; and
  (ii) impinging the radiant power onto the item of the given food for the reduced cooking time.

8. An oven for cooking food with radiant energy having a significant portion of the radiant energy in the visible light range of the electromagnetic spectrum comprising:
 a food cooking chamber having reflective inner walls,
 means for determining a hot spot on a heat absorbing surface within the food cooking chamber bounded by said walls where a residual elevated temperature exists and has a relation to the cooking time of food cooked in the oven,
 means for determining an elevation temperature of the hot spot at the time of cooking,
 means for reducing the normal cooking time for a given recipe for cooking given food by an mount related to the determined elevation of the hot spot to produce a reduced cooking time, and
 means for generating in excess of 4 kW of radiant power with the walls, the radiant power having at least 40% of its radiant energy in the visible and near-visible light range of the electromagnetic spectrum.

* * * * *